United States Patent
Thygesen

(10) Patent No.: US 11,185,818 B2
(45) Date of Patent: Nov. 30, 2021

(54) PROCESS AND APPARATUS FOR REMOVAL OF HYDROGEN SULPHIDE FROM A GAS

(71) Applicant: Biogasclean A/S, Odense SV (DK)

(72) Inventor: Peter Thygesen, Samut Prakarn (TH)

(73) Assignee: Biogasclean A/S, Odense (DK)

( * ) Notice: Subject to any disclaimer, the term of this patent is extended or adjusted under 35 U.S.C. 154(b) by 285 days.

(21) Appl. No.: 16/319,444

(22) PCT Filed: Jul. 12, 2017

(86) PCT No.: PCT/DK2017/050236
§ 371 (c)(1),
(2) Date: Jan. 21, 2019

(87) PCT Pub. No.: WO2018/014919
PCT Pub. Date: Jan. 25, 2018

(65) Prior Publication Data
US 2019/0262770 A1    Aug. 29, 2019

(30) Foreign Application Priority Data

Jul. 21, 2016 (EP) .................................. 16180586

(51) Int. Cl.
*B01D 53/52* (2006.01)
*B01D 53/78* (2006.01)
(Continued)

(52) U.S. Cl.
CPC ............ *B01D 53/52* (2013.01); *B01D 53/78* (2013.01); *B01D 53/84* (2013.01);
(Continued)

(58) Field of Classification Search
CPC ........ B01D 53/52; B01D 53/78; B01D 53/84; B01D 53/8612; B01D 2251/102;
(Continued)

(56) References Cited

U.S. PATENT DOCUMENTS 5,985,649 A    11/1999  Stensel et al.
6,375,921 B1 *  4/2002  Eickhoff .................... B01J 8/44
                                                     423/588

FOREIGN PATENT DOCUMENTS

EP           0224889 A2    6/1987

OTHER PUBLICATIONS

Yamashita, "Effect of Foam Layer on Gas Holdup in a Bubble Column", Journal of Chemical Engineering of Japan, vol. 28 No. 6, 1995. (Year: 1995).*

(Continued)

*Primary Examiner* — Anita Nassiri-Motlagh
(74) *Attorney, Agent, or Firm* — Schwegman Lundberg & Woessner, P.A.

(57) ABSTRACT

A process and apparatus for removing hydrogen sulphide from a gas is disclosed. The process comprises the steps of: providing a gas comprising hydrogen sulphide; supplying oxygen for the process if the gas does not comprise oxygen, or does not comprise sufficient oxygen for converting hydrogen sulphide to elementary sulphur; leading the mixture of gas and, if supplied, oxygen to a tank comprising i) a foam forming liquid, such as a scrubber liquid and ii) a foam layer made from said foam forming liquid on the top of the foam forming liquid where the hydrogen sulphide in the gas is oxidized to elementary sulphur to form a cleaned gas removed from hydrogen sulphide.

10 Claims, 1 Drawing Sheet

(51) Int. Cl.
  *B01D 53/86* (2006.01)
  *C10L 3/10* (2006.01)
  *B01D 53/84* (2006.01)

(52) U.S. Cl.
  CPC .......... *B01D 53/8612* (2013.01); *C10L 3/103* (2013.01); *B01D 2251/102* (2013.01); *B01D 2251/11* (2013.01); *B01D 2256/245* (2013.01); *B01D 2257/304* (2013.01); *B01D 2258/05* (2013.01); *C10L 2290/26* (2013.01); *C10L 2290/44* (2013.01); *C10L 2290/54* (2013.01); *Y02A 50/20* (2018.01); *Y02E 50/30* (2013.01)

(58) Field of Classification Search
  CPC .......... B01D 2251/11; B01D 2256/245; B01D 2257/304; B01D 2258/05; C10L 3/103; C10L 2290/26; C10L 2290/44; C10L 2290/54; Y02A 50/20; Y02E 50/30
  USPC ........................................................ 423/220
  See application file for complete search history.

(56) References Cited

OTHER PUBLICATIONS

Kuglarz et al., "Microwave and thermal pretreatment as methods for increasing the biogas potential of secondary sludge from municipal wastewater treatment plants", Bioresource Technology 134 (2013) 290-297. (Year: 2013).*
EP 0224889 A2 English Translation (Year: 1987).*
International Application No. PCT/DK2017/050236, International Preliminary Report on Patentability dated Oct. 17, 2018, 13 pgs.
International Application No. PCT/DK2017/050236, International Search Report and Written Opinion dated Oct. 5, 2018, 12 pgs.
Kennedy, N., et al., "The selective removal of $H_2S$ over $CO_2$ from biogas in a bubble column using pretreated digester effluent", Separation and Purification Technology, 144, (2015), 240-247.
Allegue, Laura Bailon, et al., "Biogas upgrading Evaluation of methods for H2S removal", Danish technological institute 31, (Dec. 2014), 31 pgs.

* cited by examiner

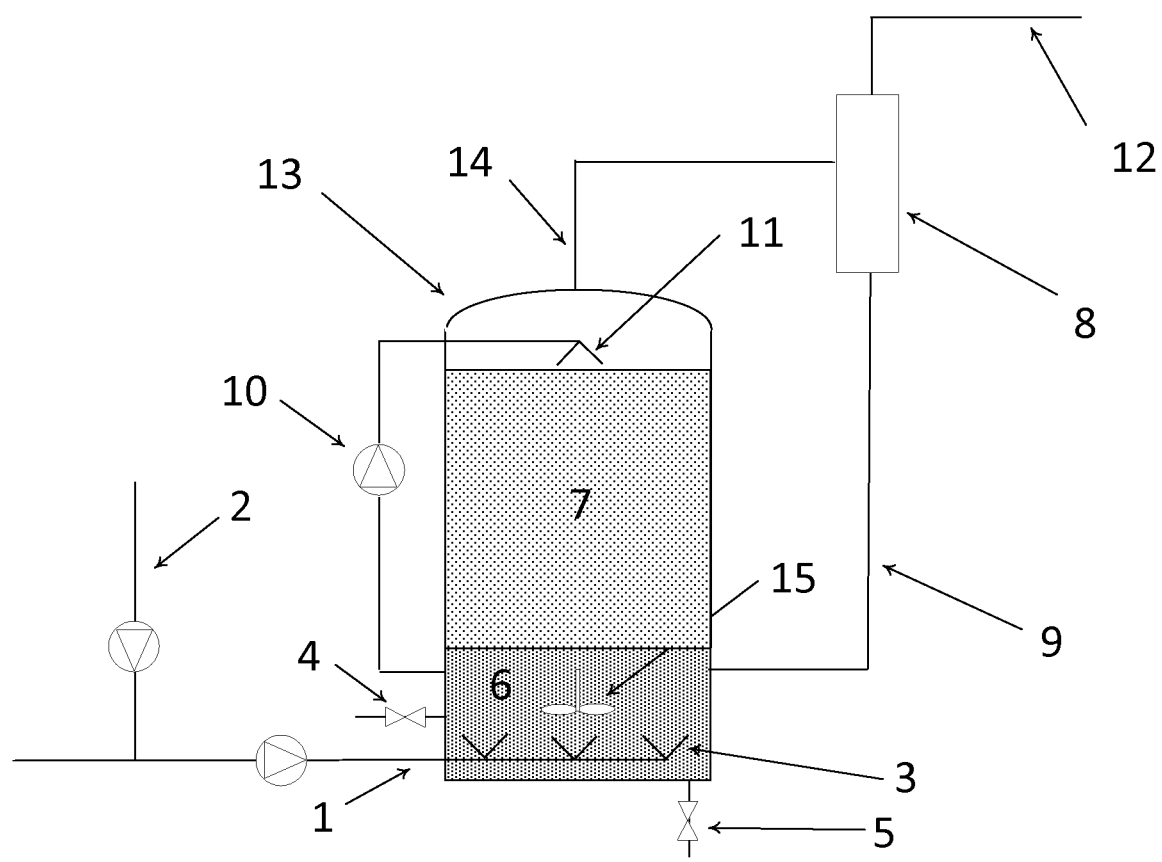

PROCESS AND APPARATUS FOR REMOVAL OF HYDROGEN SULPHIDE FROM A GAS

CROSS REFERENCE TO RELATED APPLICATIONS

This application is a U.S. National Stage Filing under 35 U.S.C. 371 from International Application No. PCT/DK2017/050236, filed on Jul. 12, 2017, and published as WO 2018/014919 A1 on Jan. 25, 2018, which claims the benefit of priority under 35 U.S.C. § 119 to European Patent Application No. 16180586.6, filed on Jul. 21, 2016, each of which is incorporated by reference herein in its entirety.

TECHNICAL FIELD OF THE INVENTION

The present invention relates to a process for removing hydrogen sulphide from a gas, in particular biogas but also landfill gas, natural gas and gas from oil and gas wells, typically before combustion, in order to reduce corrosion of equipment and reduce the emission of environmental harmful compounds to be led to the environment. But also removal of hydrogen sulphide from air to reduce emission of sulfur dioxide and other sulfur components to meet air permit regulations, etc. In particularly, the present invention relates to removal of hydrogen sulphide from a gas, wherein the gas is treated by use of a foam layer formed from a foaming liquid, said foam forming liquid may be a scrubber liquid with a naturally occurring foaming agent or a liquid with an added foaming agent.

BACKGROUND OF THE INVENTION

Throughout the world there is an increasing focus on protecting the environment and exploiting renewable energy sources. In many countries, it is now mandatory that industrial and agricultural waste streams shall be treated before discharge. The most cost-efficient method to degrade the organic matter in the waste streams is a biological process in an oxygen free environment called anaerobic digestion. The treatment takes place in big tanks or covered lagoons, the anaerobic digesters.

The organic material treated in the anaerobic digesters is called substrate and can derive from a number of different sources including manure from animals such as pigs, cattle and chicken, food processing plants, breweries, palm oil mils, starch factories, ethanol plants, paper mills, municipal sewage treatment plants, etc. Anaerobic treatment removes many of the harmful components present in the waste so that after treatment, the treated water and biomass can be discharged and/or beneficial used for fertilization and irrigation.

From the anaerobic digestion process, a by-product known as "biogas" is created. Typically biogas contains 50-70% methane ($CH_4$), 30-50% carbon dioxide ($CO_2$) and typically from 0.1% up to 5.0% hydrogen sulphide ($H_2S$). The amount of hydrogen sulphide in a biogas depend on various parameters such as the composition of the organic waste streams, the production processes as well as the design and operation of the anaerobic digester. The biogas can be a significant resource as a renewable substitute for oil and gas. However, before the biogas can be used in boilers or engines, hydrogen sulphide must be removed from the gas, since hydrogen sulphide is very corrosive to most equipment, such as pipelines, compressors, gas storage tanks, boilers, engines, etc., and acts as strong poison for fuel cells and reformer catalysts. In addition, hydrogen sulphide is toxic to human beings even in low concentrations. During combustion, hydrogen sulphide will form sulphur dioxide ($SO_2$) and sulfuric acid ($H_2SO_4$) which is very corrosive on down-stream equipment and also have harmful environmental effects. Thus, due to the severe problems hydrogen sulphide may cause, it is in many projects necessary to remove hydrogen sulphide from a combustible gas before utilization.

Several methods are known to remove hydrogen sulphide from a gas stream, for example by adsorption, water scrubbing, by membrane separation, in biofilters or biotrickling filters. Attention to biotechnological methods has increased since the methods have experienced a significant development and has the same or higher efficiency than the physical-chemical methods and since their operation costs are lower. The biotechnological methods include biofilters and biotrickling filters.

In biofilters and biotrickling filters hydrogen sulphide is removed by forcing a biogas through a moist, packaged bed that contains microorganisms. The microorganisms grow on the surface of the packed bed forming a biofilm. The hydrogen sulphide in the biogas is transferred from the gas phase to the aqueous phase and into the biofilm, where the hydrogen sulphide is used as an energy source by the microorganisms and oxidized to sulphur and/or sulphate.

The main difference between biofilters and biotrickling filters is the carrier material, which is organic in biofilters and inert in biotrickling filters. Therefore, as nutrients are not available in the carrier material of the biotrickling filters, they are supplied to the microorganisms by recirculating a liquid phase to the reactor. This liquid also provides moisture such that the microorganisms can grow and multiply.

A major problem found in both biofilters and biotrickling filters are the acidification of the media used. In biofilters, acidification of the media is due to sulfuric acid formation by degradation of hydrogen sulphide. To prevent a pH drop in the medium alkaline solvents are often added, or a carrier base having alkaline properties is used or the filter medium is often washed with water. With the biotrickling filters, hydrogen sulphide is degraded to mainly sulfate which forms sulfuric acid and pH is decreased. In biotrickling filters the sulfate is continuously washed out while the elementary sulphur remains inside the reactor and eventually will cause clogging if not cleaned out on regular basis.

In biotrickling filters and biofilters, besides sulfate also elementary sulphur is created as a conversion product of the hydrogen sulphide. The sulphur is accumulated in the biofilm of the reactor and the packed bed needs periodically to be cleaned for sulphur. In some systems the cleaning can be made by flushing or washing the packed bed. In other systems the packed bed has to be placed outside the reactor for cleaning. The cleaning for elemental sulphur may be carried out typically 2-12 times per reactor per year, where the reactor must be shut down for 1-3 days. Thus, the accumulation of sulphur inside the reactors is causing a significant down-time.

Hence, there is a need of an improved method of efficiently remove hydrogen sulphide from a gas which avoids the problems of acidification and the need of removing elementary sulphur from the filters.

SUMMARY OF THE INVENTION

Thus, an object of the present invention relates to a process for removing hydrogen sulphide from a gas, such as a biogas or air. In the case where the gas is biogas, the method is typically applied prior to combustion of the gas in order to reduce corrosion in down-stream equipment. In the case where the gas is air, hydrogen sulphide is typically removed before discharging the air into the atmosphere in order to reduce environmental impact.

In particular, it is an object of the present invention to provide a process for removing hydrogen sulphide from a gas which have an improved efficiency in removing hydrogen sulphide and involves neither acidification nor accumulation of elemental sulphur in a packed bed.

It is a further object of the present invention to provide an alternative to the prior art.

Thus, one aspect of the invention relates to a process for removing hydrogen sulphide from a gas, comprising the steps of:
 providing a gas comprising hydrogen sulphide
 supply oxygen for the process if the gas does not comprise oxygen, or does not comprise sufficient oxygen for converting hydrogen sulphide to elementary sulphur
 lead gas comprising hydrogen sulphide and, if supplied, oxygen to a tank (13) comprising
  i) a liquid layer (6) comprising a foam forming liquid, and
  ii) a foam layer (7) made from said foam forming liquid, wherein said foam layer (7) is formed on the top of the foam forming liquid (6), and said foam layer is at least 0.5 meter high, such that said gas comprising hydrogen sulphide is led through said foam layer, and hydrogen sulphide in the gas is converted to hydrogen sulphide converting products, and
 lead the cleaned gas to outlet (14) and the hydrogen sulphide conversion products to outlet (5).

The foam forming liquid may in an embodiment of the invention be a scrubber liquid, and the foam forming liquid and/or scrubber liquid may optionally comprise sulphur degrading microorganisms. This means that if the foam forming liquid or the scrubber liquid contains microorganisms, the foam produced from the foam forming liquid may also comprise these microorganisms. Accordingly, if the microorganisms are present, they may at least assist in degrading the hydrogen sulphide in the gas to form a cleaned gas where the hydrogen sulphide has been removed.

Another aspect of the present invention relates to an apparatus for removing hydrogen sulphide from a gas comprising:
 a tank (13) configured to comprise a liquid layer (6) comprising a foam forming liquid, and a foam layer (7) above the liquid layer (6), said foam layer being formed from the foam forming liquid in the liquid layer (6);
 an inlet (1) for supplying the gas comprising hydrogen sulphide to the tank (13);
 one or more foam forming devices (3, 11, 15) for producing a foam layer (7) from the foam forming liquid;
 an outlet (5) for draining foam forming liquid and hydrogen sulphide conversion products, such as elementary sulphur, dispersed in the liquid;
 an inlet (4) for adding foam forming liquid;
 outlet (14) for outletting cleaned gas.

Prior to discussing the present invention in further details, the following terms and conventions will first be defined:

Foam forming liquid is typically used to reference liquid which have properties allowing it to form a foam. Foam forming liquid may typically include a foaming agent that facilitates formation of foam. The foaming agent may for example be a surfactant and/or a biological material.

In certain preferred embodiments, the foam forming liquid is a scrubber liquid. The scrubber liquid may for example be effluent water from a biogas digester or a waste water treatment plant. The scrubber liquid is characterized in that it comprises various nutrients, such as for example proteins, minerals and salts.

Foam and Bubble:

A foam is typically considered to be a substance that is formed by trapping pockets of gas in a liquid. Each of said trapped pockets of gas is typically considered to be a bubble. The foam may be closed-cell foam, where the gas forms discrete pockets, each completely surrounded by the foam forming liquid or may be an open-cell foam, wherein the gas pockets connect with each other or a combination of both.

Unless defined otherwise, all technical and scientific terms used herein have the same meaning as commonly understood by one skilled in the art.

BRIEF DESCRIPTION OF THE FIGURES

The present invention and in particular preferred embodiments thereof will now be described in more detail with regard to the accompanying FIGURE. The FIGURE show one way of implementing the present invention and is not to be construed as being limiting to other possible embodiments falling within the scope of the attached claim set.

FIG. 1 is a schematically illustration of an apparatus for removing hydrogen sulphide from a gas according to a first embodiment of the invention;

DETAILED DESCRIPTION OF THE INVENTION

Reference is made in the following to FIG. 1 by use inter alia of the reference numbers presented in that FIGURE.

On a Process According to the Present Invention:

The present invention relates in an aspect to a process for removing hydrogen sulphide from a gas, comprising the steps of:
 providing a gas comprising hydrogen sulphide
 supply oxygen for the process if the gas does not comprise oxygen, or does not comprise sufficient oxygen for converting hydrogen sulphide to elementary sulphur;
 lead the gas comprising hydrogen sulphide and, if supplied, oxygen to a tank (13) comprising
  i) a liquid layer (6) comprising a foam forming liquid, and
  ii) a foam layer (7) made from said foam forming liquid, wherein said foam layer (7) is formed on the top of the foam forming liquid (6), and said foam layer is at least 0.5 meter high, such that said gas comprising hydrogen sulphide is led through said foam layer, and hydrogen sulphide in the gas is converted to hydrogen sulphide converting products, and
 lead the cleaned gas to outlet (14) and the hydrogen sulphide conversion products to outlet (5).

The gas comprising hydrogen sulphide may be any gas comprising hydrogen sulphide and which is wished to be cleaned from hydrogen sulphide. However, in an embodiment of the invention, the gas is selected from a biogas, landfill gas, natural gas or gas from oil and gas wells or air. In a preferred embodiment of the invention, the gas is a biogas produced from an anaerobic digester. The biogas may in addition to hydrogen sulphide comprise methane and carbon dioxide and the amount of hydrogen sulphide in the biogas is typically in the amount from 0.1 up to 5%. In another embodiment, the gas is air that is wished to be cleaned from hydrogen sulphide.

In some embodiments, cleaned gas leaves the tank in combination with bubbles (foam) at outlet (14) from the foam layer (7). Such bubbles (foam) and/or the liquid from which the bubbles are formed from may be undesirable contaminants in the clean gas. The cleaned gas may therefore be separated from foam before being led to the outlet (12).

In the context of the present invention, the term "cleaned gas" means a gas where hydrogen sulphide is reduced to an amount below 1000 ppm, preferably below 500 ppm, more preferably below 250 ppm, such as from 10 to 200 ppm.

In the process according to the present invention, hydrogen sulphide is converted to hydrogen sulphide conversion products by a chemical oxidization. Elementary Sulphur is a conversion product.

As the chemical conversion of hydrogen sulphide to elementary sulphur is an oxygen consuming conversion, sufficient oxygen for the conversion is needed inside the tank. Therefore, if the oxygen content in the gas to be treated is low, additional oxygen should be added to the tank. The oxygen may either be added directly to the gas before the gas is lead to the tank, such that a mixture of gas and oxygen is led to the tank. Alternatively, the gas and oxygen may be introduced into the tank separately. In a preferred embodiment of the present invention, oxygen is injected directly into the gas and the mixture of gas and oxygen is subsequently introduced into the tank.

The oxygen added to the gas is selected from the group consisting of gasses having from 21 to 100% oxygen, for example air having an oxygen content of 21% and pure oxygen containing 100% oxygen. However, other gasses having a higher oxygen content than air could be used, such as gasses having at least 21% oxygen, preferably at least 50% oxygen and more preferably at least 80% oxygen. In one embodiment, the oxygen added is pure oxygen and in another embodiment, the oxygen added is in the form of air.

The amount of oxygen added will depend on the hydrogen sulphide level in the gas to be treated.

In an embodiment of the invention, the oxygen injection is controlled.

This may for example be by using a frequency regulated air blower and adjusting the air injection to the actual hydrogen sulphide load so only the oxygen needed for the process is injected. The oxygen in the air is used for oxidation of hydrogen sulphide to elementary sulphur. The injection of oxygen is controlled to secure that no explosive mixture is created between oxygen and methane or other combustible gases.

Oxygen is used in the process to oxidise hydrogen sulphide to sulphur and the amount of oxygen supplied to the process should be sufficient in order to cover the following overall reaction with hydrogen sulphide: $H_2S$ (gas)+½ $O_2$ (gas)→S (solid)+$H_2O$ (liquid). Typically there will be an amount of oxygen in the cleaned gas after the hydrogen sulphide has been removed.

Therefore, the amount of oxygen may for example be at least 1 mole oxygen for every 2 mole of hydrogen sulphide. However, it is preferred to use an excess of oxygen in the process, such as for example 0.1 to 5.0% oxygen in excess, preferably for 0.2 to 1.0% oxygen in excess.

The conversion of hydrogen sulphide to elementary sulphur according to the present invention is a chemical reaction, i.e. a chemical oxidation.

In a biotrickling filter where the hydrogen sulphide is oxidized by microorganisms primarily to sulfate the overall reaction is as follows: $H_2S$ (gas)+$2O_2$ (gas)→$H_2SO_4$ (liquid). This means that the oxygen requirements in the process according to the present invention is only 25% compared to a biotrickling filter. This results in lower dilution of the heating value of the combustion gas and may make it feasible to use the invention for $H_2S$ removal up-stream upgrading systems for production of bio-methane.

The temperature in the tank during the oxidation of the hydrogen sulphide is preferably kept as low as possible to obtain a higher solubility of gasses, however, the temperature should be sufficiently high to avoid freezing. The temperature in the tank, i.e. of the liquid in the liquid layer and foam in foam layer, should preferably be at least 5° C., such as from 5 to 60° C., preferably 25 to 55° C. In countries with tropical climate there is no need for insulation of the tanks. However, in moderate and colder climates the tanks may be insulated. The liquid in the tank may be heated from the increase in the gas temperature generated from the gas compression and/or via a heat exchanger. The heating by a heat exchanger is typically provided as hot engine jacket water from cooling of the engine.

The hydrogen sulphide in the gas is transferred from the gas phase to the aqueous phase in the foam forming liquid in the liquid layer and/or in the moisture in the foam layer and afterwards oxidised to elemental sulfur (S). The elementary sulfur will be dispersed and float in the liquid, due to the continuous agitation of the liquid from the gas flow and the foam forming devices, and be discharged by draining foam forming liquid through the second outlet (5).

In some embodiments the elementary sulphur may be removed from the effluent from the tank (13) by simple sedimentation or in sedimentation tanks or by means of e.g. hydro cyclones or centrifuges located down-stream outlet (5). Hereby, the effluent is left almost sulphur free and the produced elementary sulfur may be used for other processes or products. Oxidation into sulphate will only be in minor amounts and therefore the pH of the foam forming liquid, such as the scrubber liquid is maintained at entry level, typically at pH 7-8. The removal of elementary sulphur from the effluent will be outside the tank.

This is contrary to a biotrickling filter, where most of the sulphur will be further converted to sulphate (504) which reacts with water and form sulfuric acid ($H_2SO_4$). The formed sulfuric acid in biotrickling filters will cause the pH of the liquid to decrease to pH below 4. If treated waste water is used as liquid, the pH will typically be 3 to 4 and if water with nutrients added are used, the pH may drop below 1.0. The produced sulphate in a bio trickling filter is discharged with the liquid from the tank while the elementary sulphur will stick to the packed bed and lead to clogging if not cleaned frequently.

A key feature of the present invention is the foam layer (7) made of the foam forming liquid, such as a scrubber liquid. The foam layer may be made by a foam forming device such as a foam gun (also referred to as a foam nozzle, foam nozzle spray or foam pipe) which produces foam by introducing gas into the foam forming liquid under high pressure and velocity. Alternatively or in combination therewith, the foam layer can be made by using an impeller in the foam forming liquid. The foam layer (7) is formed as a blanket of foam on the top of the liquid layer (6) and is controlled to be "heavy" with small bubbles.

In a preferred embodiment of the invention, the foam layer (7) is at least 0.5 meter, such as at least 1 meter, preferably at least 1.5 meter, even more preferably at least 2 meter. The foam layer (7) may for example be from 0.5 to 12 meter, such as from 0.75 to 11 meter, preferably from 1.0 to 10 meter, more preferably from 2.0 to 8 meter.

In a preferred embodiment of the invention, the liquid layer is at least 0.3 m and up to 5 m, more preferably at least 0.5 m and up to 3 m. In an embodiment, the liquid layer is 3 meter or below, such as 2.5 meter or below, preferably 2.0 meter or below, even more preferably 1.5 meter or below, most preferably 1.0 meter or below The foam layer of the present invention is important, since the inventors of the present invention surprisingly have found out that conversion of hydrogen sulphide in a gas to elementary sulphur is increased when the gas is dispersed in a foam layer instead of a liquid layer. Without being bound by theory, the present inventors have found out that conversion of hydrogen sulphide is highly enhanced by the presence of a large surface of the foam forming liquid provided by the walls of the foam.

Normally foam is avoided in a biogas digester and antifoam agents are normally used in traditionally biogas digesters. However, the inventors of the present invention have surprisingly found out that a foam layer has beneficial effects in degrading hydrogen sulphide. The inventors of the present invention have found out that when using a foam layer, the hydrogen sulphide is converted to elementary sulphur and only a little or no sulphate is created. On the contrary, in for example biotrickling filters and biofilters, the hydrogen sulphide is converted to sulphate and the liquid becomes very acidic. In addition, when the foam layer is used, it is possible to use a much smaller size of the tank, since the efficiency is highly increased by use of a foam layer instead of a liquid.

The foam forming liquid making up the foam layer may in a preferred embodiment comprise one or more foam forming agents that facilitates/increases the foam forming. The foam forming agent may for example be a surfactant and/or a biological material.

In a preferred embodiment of the invention, the foam forming liquid comprises one or more proteins as foaming agent (foam forming agent). The protein may be any kind of protein, the type of the foam forming protein is not critical and the present invention is not to be limited to a specific type of protein used to form the foam layer.

Proteins are made by chains of amino acids. These chains can either be long chains or branched chains. The larger the number of amino acids present in the protein, the larger is the molecular weight of the protein. The amino acids may be either hydrophilic or hydrophobic.

Proteins in the foam forming liquid may increase foam forming. Alternatively, proteins may be added to the foam forming liquid as a foam forming agent, in case the foam production has to be increased or in case the foam forming liquid shall be produced from water mixed with a foaming agent.

Foam can be defined as a two-phase system comprising air/gas cells separated by a thin continuous liquid layer. Proteins contribute to the uniform distribution of fine air cells in the foam structure. Proteins as foaming agents stabilize foams rapidly and effectively by 1) diffuse the air/water interface and decrease the surface tension of the air-liquid interface, 2) the proteins unfold at the interface with orientation of the polar moieties towards the water, 3) polypeptides interact to form a film around the bubbles with possible partial denaturation.

Proteins rapidly adsorbs at the interface and form a stabilizing film around bubbles which promote foam formation.

In another embodiment of the invention, the foam forming liquid comprises one of more catalysts to facilitate the oxidation hydrogen sulphide. The catalyst may be one or more of iron, molybdate, niobium, titanium, potassium, manganese, cobalt or similar compounds. The one or more catalyst is selected from carbon-based catalysts and metal oxide based catalysts. The carbon based catalysts may be activated carbon. The metal oxide based catalysts may be selected from the group of iron oxide, molybdenum trioxide, cobalt oxide, niobium oxide, and titanium oxide.

In some preferred embodiments, the gas is supplied to the tank (13) as bubbles. Such bubbles may for example be provided by letting the gas through an porous element arranged in the liquid layer (6) and having pores configured for providing bubbles according to the desired bubble size. Such introduction of bubbles may at least assist in producing the foam inside the tank 13. In some embodiments, the gas is supplied to the tank in the foam layer (7).

The foam forming liquid, such as scrubber liquid has a pH of 6-9, preferably 7-8, whereas pH in a biofilter or biotrickling filter decreases to below pH 4 unless very high amounts of water or chemicals are used to keep pH in the neutral range. As the pH of the discharge liquid is 6-9, preferably 7-8, the discharge meets the discharge requirements in nearly all applications and countries. The discharge liquid in biofilters and biotrickling filters are typically 1 to 4 and this exceed the discharge regulations in some applications. Furthermore, the neutral pH of the discharge liquid in the present invention makes it possible to construct the tank(s) used in the process of the invention in a wide range of materials, whereas a biotrickling filter has to be constructed from a special acid-proof material.

In addition, the cleaning efficiency is significantly increased with the present invention as compared to using for example biotrickling filters. Cleaning of a gas by leading the gas through a foam layer of foam forming liquid according to the present invention results in a cleaning capacity being about 200 g hydrogen sulphide per $m^3$ foam compared to a capacity of about 50-60 g hydrogen sulphide per $m^3$ packed media for a biotrickling filter. Thus, the process according to the present invention indicates to be at least twice, such as at least 3-4 times as efficient in cleaning hydrogen sulphide from a gas than a biotrickling filter process. Therefore, physical size of the tank for cleaning the gas can be much smaller. This is beneficial since it allows to use pre-fabricated tanks also for high hydrogen sulphide loads, whereas tanks for bio trickling filters for projects with high hydrogen sulphide loads must be build on-site because they in order to have the same capacity are much larger. In addition, smaller tanks decreases production costs.

The inventors of the present invention have not registered any decrease or reduction of hydrogen sulphide from a gas bubbled through a liquid layer without the foam layer.

In addition, the process according to the present invention has a very short start-up time. It takes less than 1 hour going from zero to full capacity. On the contrary, a biotrickling process with packaged beds takes 24-72 hours from start-up to obtain full capacity. This makes it possible to use the invention for hydrogen sulphide removal also in projects where the biogas flow is intermittent (stop/go).

In the process according to the present invention there is little or no sulphur accumulate. As mentioned earlier, the elementary sulphur can easily be discharged with the draining of the foam forming liquid. Therefore, maintenance is kept at a minimum.

Cleaning of a gas comprising hydrogen sulphide in the process according to the present invention will work as follows. The gas is led to a tank (tank 13 in FIG. 1). The gas is led into the tank in the liquid layer or in the lower part of the foam layer, such as in the lowest 10% of the foam layer.

If the gas does not comprise oxygen, air, pure oxygen or another gas with oxygen is injected into the gas, preferably at the inlet (2) to the tank or alternatively directly to the tank (not shown in FIG. 1). The gas comprising hydrogen sulphide and, if supplied, oxygen moves upward in the tank (13) in contact with the foam layer by gravity and the hydrogen sulphide is oxidized to elementary sulfur. The elementary sulfur will sink downwards into the foam forming liquid, while the clean gas will move upward and leave the tank at outlet (14) in the top of the tank (13). The gas may be mixed with foam when leaving the tank at outlet (14). If mixed with foam, the mixture of cleaned gas and foam from outlet (14) may be separated by means (8) for separating cleaned gas from foam by passing through a separator, for example a knock-out pot, which separates the foam from the clean gas and clean gas is led to first outlet (12). The foam separated from cleaned gas by means (8) may be recirculated to the tank (13) by a foam connector (9) and clean gas is led to the first outlet (12).

In an embodiment of the invention the gas to be cleaned from hydrogen sulphide is supplied to the tank as bubbles by leading the gas through bubble forming means (3). The introduction of the gas as bubbles may be done by introducing the gas to the tank through fine bubble diffusers or a porous material.

In a further embodiment of the invention, the gas comprising hydrogen sulphide and, if supplied, oxygen is injected into the tank directly into the foam layer (7) of the tank.

In a further embodiment of the invention, the foam forming liquid further comprises sulphur degrading microorganisms. Said sulphur degrading microorganisms are preferably *Thiobacillus* bacteria.

On an Apparatus According to the Present Invention:

Reference is made to FIG. 1 schematically illustrating an apparatus for removing hydrogen sulphide from a gas according to preferred embodiments of the invention.

As illustrated in FIG. 1, the apparatus preferably comprises a tank (13) configured to comprise a foam forming liquid in a liquid layer (6), and foam in a foam layer (7) above the liquid layer (6) said foam layer being formed from the foam forming liquid in the liquid layer (6). The tank may be made from a material being resistant to the various components contained in the tank, e.g. $H_2S$ and is in a preferred embodiment made from fibre-reinforced plastic but stainless steel or coated carbon steel may also be used.

The upper end of the tank (13) may preferably be dome shaped so as to define a funnel assisting in leading gas and/or bubbles to an upper most position at which position and outlet (14) advantageously may be arranged.

The apparatus typically comprises an inlet (1) for supplying the gas comprising hydrogen sulphide to the tank (13). As illustrated in FIG. 1, the inlet (1) may be provided with a blower so as to conduct the gas into the tank. If the gas has a pressure being higher than the pressure inside the tank (13), the blower may be replaced with control valve (not illustrated) for controlling the flow of gas into the tank. It is noted, a combination of a control valve and blower may be preferred also in cases where the gas needs to be conducted into the tank (13) and the amount of infeed gas is to be controlled. Further, the means disclosed above as to regulation of flow may also be applied.

As presented herein, the invention resides in the presence of a foam layer (7) provided above a liquid layer (6) inside the tank (13). Such a foam layer (7) may be provided by one or more foam forming devices (3, 11, 15) configured for producing a foam layer (7) from the foam forming liquid. As will be presented in further details below, such foam forming devices may be arranged in different regions of the tank and has the purpose of acting on/with the foam forming liquid to produce a foam made of bubbles. Typically and preferably, the bubbles share walls in the sense that the bubbles can be viewed as cells in the foam layer (7). The walls of the bubbles are made from the foam forming liquid.

The apparatus further preferably comprises an outlet (5) for draining foam forming liquid and hydrogen sulphide conversion products, such as dispersed elementary sulphur. It is noted that the elemental sulphur from the process settles into the liquid layer 6 where it is dispersed and floating due to the agitation from the foaming devices 3, 11, 15.

As foam forming liquid together with the dispersed elementary sulphur is removed through the outlet (5), additions such as topping-up of foaming liquid is needed. Further, upon start-up of the apparatus foam forming liquid is to be introduced into the tank (13). Thus, to accomplish these aims, the apparatus may comprise an inlet (4) for adding foam forming liquid into the tank (13). As illustrated in FIG. 1, the inlet (4) may be equipped with a valve, such as a control valve or a shut-off valve to control the flow of foam forming liquid into the tank; the valve may also be used to assure that foam forming liquid does not flow out of the tank (13).

The gas is cleaned while it is located inside the tank and is outlet from the tank through a outlet (14) for outletting cleaned gas. As will be elucidated below, the outlet may be configured for removing foam from the gas, if such foam escape the tank (13) with the cleaned gas.

As it is found that the upper part of the interior of the tank (13) typically comprises cleaned gas, the outlet (14) (see FIG. 1) is typically arranged at a vertical extremity of the tank (13).

As presented herein, some gasses to be cleaned contains sufficient oxygen to allow for a conversion of most, such all, $H_2S$ contained in the gas into elementary sulphur and other gasses don't. If addition of oxygen is needed to convert the hydrogen sulphide, the apparatus may further comprise means (2) for supplying oxygen to the tank (13). In FIG. 1 the means (2) for supplying oxygen is illustrated as being a fluid connection to inlet (2) with a blower for mixing oxygen into the stream of gas to be cleaned prior to said stream of gas being introduced into the tank (13). Again, the blower may be replaced and/or combined with a controllable valve to control the amount of oxygen being mixed into the stream of gas to be cleaned, or the other control means disclosed herein may be applied.

In other embodiments, the means (2) for supplying oxygen may supply oxygen into the interior of the tank (13) through a separate inlet (not shown in FIG. 1) leading oxygen directly into the tank (13).

The inlet (1) for leading the gas to the tank may comprise bubble forming means (3) such as fine bubble diffusers, such as a porous element with pore size in the micro-meter range. Such bubble diffusers are preferably arranged at the bottom of the tank and directs bubble upwardly through the liquid layer—in this manner, the bubble diffusers is configured for producing foam of the foam layer (7) and thereby a bubble diffuser (3) operates as a foaming device (3).

In certain preferred embodiments, the fine bubble diffusers may be movable arranged in vertical direction and may advantageously be arranged above liquid layer (6) during use of the apparatus. Alternatively or in combination thereto, the level of foam forming liquid may be raised or lowered whereby the position of the bubble diffusers relatively to the surface of the foam forming liquid can be altered.

However, if a requirement for increase foam production occurs, the bubble diffusers may be submerged into the liquid layer (6).

Alternatively, or in combination with the bubble diffuser(s) (3), there can be installed one or more foam forming devices such as a foam spray nozzle (11) which may also be termed a foam pipe arranged at an upper end of the tank (13), an impeller (15) arranged in the lower end of tank (13) in the liquid layer (6) or combinations thereof. The impeller may also be a stirrer or a whisk.

A foam spray nozzle (11), as illustrated in FIG. 1, and being arranged at an upper end of the tank (13) typically uses foam forming liquid supplied from the liquid layer (6) through a liquid connection (10) including a pump. The foam spray nozzle (11) may be in the form of a foam nozzle/foam pipe which has an inlet for gas and an inlet for foam forming liquid. The inlet for gas is typically arranged at the upper end of the tank (13) whereby the gas used to "fill" the bubbles is to at least to a large extent cleaned gas. The liquid forming the walls of the bubbles is, accordingly, typically the foam forming liquid.

A stirrer/impeller/whisk (15) is typically motor driven, e.g. by a electrical, pneumatic or hydraulic motor rotating a shaft of the stirrer/impeller/whisk (15) may be arranged in the liquid layer (6) so as to provide a movement of the foam forming liquid to produce the foam.

In some situations, the cleaned gas leaving the tank (13) is accompanied by a stream of foam, which in general is not preferred. In order to prevent this, the apparatus may further comprise means (8) for separating cleaned gas from foam. Such means may be a conventional foam trap or a knock-out pot and the means for separating cleaned gas from foam is in fluid connection with the interior of the tank 13. The means typically comprises an outlet (12) for outletting the cleaned gas without foam from the apparatus and a fluid connections (9) leading to the tank (13) for recirculating foam and/or the liquid which formed the foam back to the tank (13).

It should be noted that embodiments and features described in the context of one of the aspects of the present invention also apply to the other aspects of the invention.

All patent and non-patent references cited in the present application, are hereby incorporated by reference in their entirety.

LIST OF REFERENCE SYMBOLS USED

1 Inlet for supplying gas to the tank
2 Means for supplying oxygen (or air) to the tank
3 Diffuser
4 Means for introducing fluid to tank
5 Means for draining fluid from the tank
6 Liquid layer in the tank
7 Foam layer in the tank
8 Foam trap
9 Foam connection between trap and tank
10 Liquid pump and connection
11 Foaming device
12 First outlet
13 Tank
14 Outlet for outletting cleaned gas from the tank
15 Foaming device

The invention claimed is:

1. A process for removing hydrogen sulphide from a gas, comprising the steps of:
   providing a gas comprising hydrogen sulphide
   supplying oxygen for the process if the gas does not comprise oxygen, or does not comprise sufficient oxygen for converting hydrogen sulphide to elementary sulphur;
   leading the gas comprising hydrogen sulphide and, if supplied, oxygen to a tank comprising:
   i) liquid layer comprising a foam forming liquid comprising one or more foam forming agents,
   ii) a foam layer of at least 0.5 meter high on the top of the foam forming liquid,
   operating one or more foam forming, whereby said foam layer is maintained on the top of the foam forming liquid, and whereby said gas comprising hydrogen sulphide is led through said foam layer, and whereby hydrogen sulphide in the gas is converted to hydrogen sulphide converting products, and
   leading the cleaned gas to outlet for outletting cleaned gas and the hydrogen sulphide conversion products to another outlet for draining hydrogen sulphide conversion products.

2. The process according to claim 1, wherein the foam forming agent is a surfactant and/or a biological material.

3. The process according to claim 2, wherein the foam forming agent is one or more proteins.

4. The process according to claim 3, wherein the foam forming liquid comprises one or more catalysts.

5. The process according to claim 1, wherein the cleaned gas led from outlet is separated from any foam, if present in the cleaned gas, by means for separating cleaned gas from foam and the cleaned gas separated from foam is led to a first outlet for cleaned gas separated from foam.

6. The process according to claim 5, wherein the foam separated from cleaned gas by means is recirculated to the tank by a foam connection.

7. The process according to claim 1, wherein the oxygen supplied for the process is selected from the group consisting of gasses comprising from 21 to 100% oxygen.

8. The process according to claim 1, wherein the gas is supplied to the tank as bubbles by leading the gas through bubble forming means.

9. The process according to claim 1, wherein the gas is selected from at least one of biogas, landfill gas, natural gas, gas from oil and gas wells, and air.

10. The process according to claim 1, wherein the pH of the foam forming liquid is from 6 to 9.

* * * * *